Patented June 19, 1951

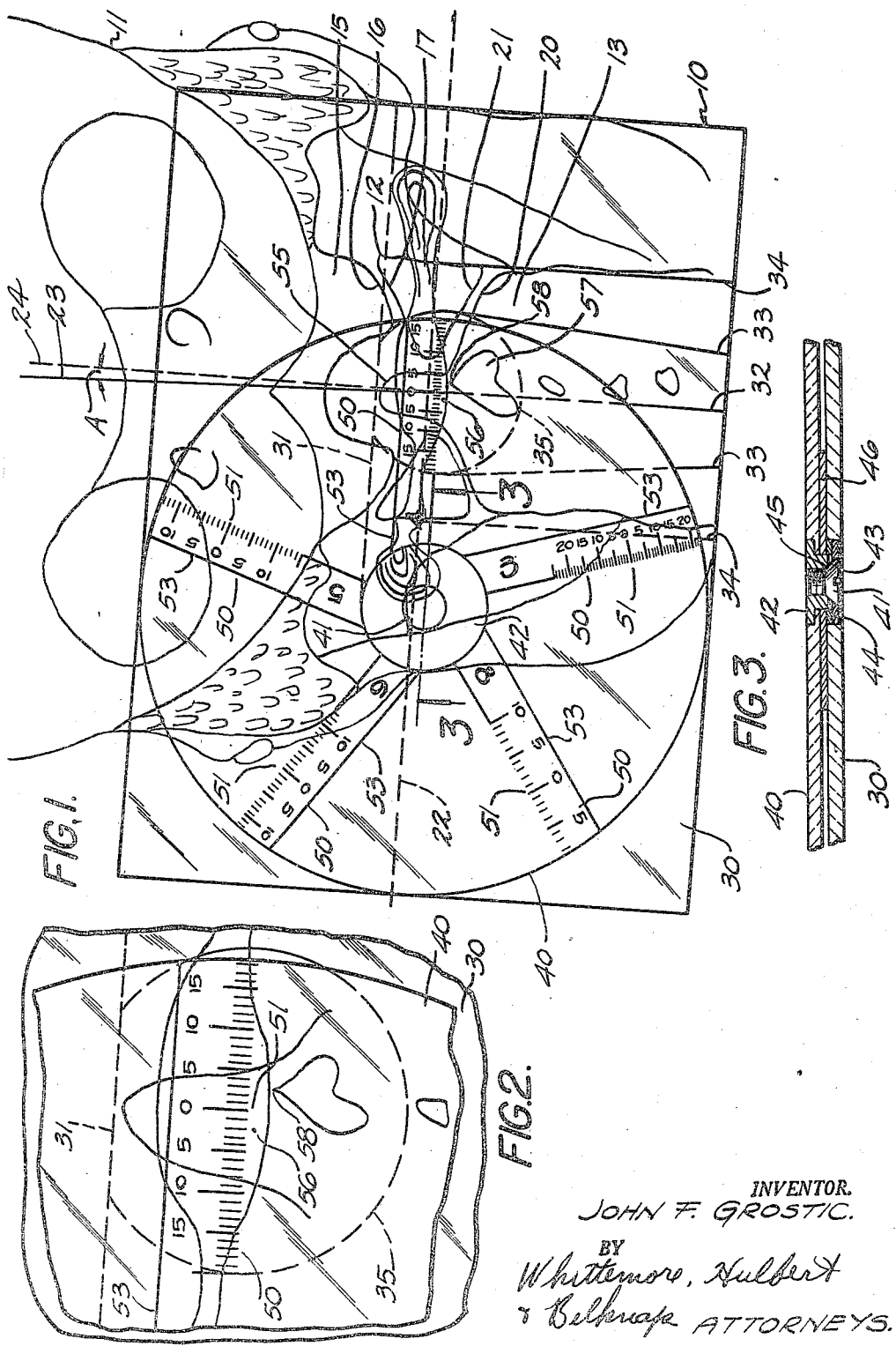

2,557,428

UNITED STATES PATENT OFFICE 2,557,428

INSTRUMENT FOR DETERMINING DISPLACEMENTS IN X-RAY PHOTOGRAPHS

John F. Grostic, Ann Arbor, Mich.

Application March 7, 1947, Serial No. 733,261

6 Claims. (Cl. 33—1)

The present invention relates to an instrument for determining displacements in X-ray photographs, herein referred to as a densmeter, which is an instrument used in the analysis of X-ray pictures of the spine and upper vertebrae for determining the lateral displacement of the odontoid and spinous processes of the axis vertebra with respect to the atlas vertebra.

It is an object of the present invention to provide an instrument adapted to afford a direct reading of the lateral displacement of the odontoid and spinous processes of the axis vertebra relative to the atlas vertebra, which displacement is measured in degrees of arc of a circle substantially equal in diameter to the diameter of the condylar circle.

It is a further object of the present invention to provide an instrument having a rotatable disk thereon provided with a plurality of scales for measuring lateral displacement between portions of the axis and atlas vertebrae in degrees of arc of circles of different diameters depending upon the diameter of the condylar circle present in the particular X-ray picture.

It is a further object of the present invention to provide means for affording a direct reading of the lateral displacement of elements of the axis vertebra with respect to the atlas vertebra.

Other objects and features of the invention will become apparent as the description proceeds, especially when taken in conjunction with the accompanying drawings, wherein:

Figure 1 is a view of the densmeter applied to an X-ray picture of the skull and upper vertebrae;

Figure 2 is an enlarged view of the scale of the densmeter; and

Figure 3 is a fragmentary section through the densmeter taken on the line 3—3 of Figure 1.

The densmeter illustrated herein is one of a group of instruments to be applied to an X-ray photograph or picture of the skull and upper vertebrae, and its greatest utility is realized when it is employed in conjunction with the other instruments. However, it may be employed alone if desired.

Referring now to Figure 1, the densmeter 10 is illustrated as superimposed over a portion of an X-ray picture showing a portion of a skull 11, the atlas vertebra 12 and the axis vertebra 13. The occipital bone of the skull is provided with two downwardly extending condyles 15 having inferior articulating surfaces 16. The articulating surfaces 16 rest upon the superior articulating surfaces 17 of the atlas vertebra 12.

The axis vertebra 13 is provided with superior articulating surfaces 20 which engage the inferior articulating surfaces 21 of the atlas vertebra 12. The curvature of the articulating surfaces 16 determines the diameter of a circle which is referred to herein as the condylar circle. The curvature of the articulating surfaces 20 and 21 determines the diameter of a circle which is referred to herein as the axial circle. The diameter of curvature of the condylar and axial circles may be determined by comparing these with circles of known diameters. It will be apparent from Figure 1 of the drawing that if the generally vertical axis or center line of the skull 11 is inclined from a perpendicular to a generally horizontal plane determined by corresponding portions of the atlas vertebra, this angular displacement may properly be regarded as lateral displacement of the atlas vertebra measured in degrees of arc of a circle equal in diameter to the diameter of the condylar circle. Thus in Figure 1 the line 22 has been drawn representing the plane of the atlas vertebra and the line 23 has been drawn representing the axis or median line of the skull 11. It will be observed that the line 23 deviates from a perpendicular 24 to the atlas plane line by an angle A of approximately 1½°. This corresponds to a 1½° displacement of the atlas 12 to the left, as seen in Figure 1.

By the use of other instruments or by direct measurement the diameter of the condylar circle determined by the curvature of the articulating surfaces 16 and 17 has been found to be four inches.

The densmeter 10 comprises a generally rectangular plate 30 of a transparent material, such for example as a suitable transparent plastic. The plate 30 is preferably of substantial thickness so as to impart rigidity to the instrument and to provide for an adequate support of other structure to be defined later. The plate 30 is provided with positioning means which comprises a plurality of lines scribed or otherwise provided thereon. The first of these lines is indicated at 31 and is employed to facilitate placement of the instrument in proper relation with respect to the atlas plane line 22 previously referred to. For this purpose the line 31 is brought into parallelism with the atlas plane line 22. The densmeter is provided with a center line 32 which is perpendicular to the line 31 previously referred to. Symmetrically placed with respect to the center line 32 and inclined slightly with respect thereto are lines 33. These lines correspond generally to the outline of the neural canal and are used in determining the lateral positioning of the densmeter. Located outwardly from the lines 33 are a pair of lines 34 which are parallel to the center line 32. These lines are useful in correcting the lateral displacement of the densmeter by comparison with elements of the atlas vertebra.

It will be understood bones are not always symmetrically formed and therefore proper placement of the instrument depends upon a judicious balancing of mass to the right and left of the center line 32 and particularly by comparison of the lines 33 and 34 with corresponding portions of the bony structure and more specifically of the atlas vertebra. A small circle 35 is provided on the plate 30 and represnts the neural canal. The circle 35 is symmetrically placed with respect to the center line 32.

Mounted on the plate 30 is a transparent rotatable disk 40 which is shown as secured thereto by a bolt 41 and a nut 42 recessed in the upper surface of the disk 40. The bolt 41 has a tapered conical portion 43 which fits into a correspondingly conical portion of a bushing 44 carried by the plate 30, and the nut 42 is provided with a correspondingly conically tapered portion 45. Intermediate the plate 30 and the disk 40 is a washer 46, preferably formed of a friction material which will permit rotation of the disk 40 but at the same time will prevent inadvertent rotation thereof in use.

The disk 40 is provided with a plurality of scales 50, each of which has a zero point as indicated at 51 and is graduated both right and left from the zero point in degrees. As seen in Figure 1, the scales 50 are marked 3, 4, 5, 6 and 8, respectively, and these markings indicate the scale to be used with a condylar circle of the value indicated. Thus, for example, in Figure 1 the scale numbered 4 is in position for use, and accordingly the diameter of the condylar circle, that is, the circle determined by the articulating surfaces 16, is approximately four inches. It is expected that the scale nearest to the actual observed diameter of the condylar circle will be employed. Thus, for example, if the diameter of the condylar circle is slightly greater than seven inches, the scale numbered 8 will be employed.

The disk 40 is rotated to bring the preselected scale into operative position, at which time the zero point 51 overlies the center line 32 provided on the plate 30. Each scale is provided with a line 53 which overlies the numerals applied to the divisions of the scale and this line 53 is brought into parallelism with the line 31 provided on the densmeter, and accordingly is thus brought into parallelism with the atlas plane line 22 previously referred to.

In placing the densmeter over the X-ray picture the circle 35 and the lines 33 and 34 are employed so that the atlas appears equal distances on the right and left from these lines, especially so in the region of the atlas where its posterior arch attaches to the lateral masses of the atlas. Where the portions of the atlas are not symmetrical, the skilled operator uses a number of check points with respect to the lines on the instrument to provide for a symmetrical placement so that the center line 32 of the instrument corresponds to the center of the atlas. In the illustrated case it was determined by other means that the atlas was 1½° to the left and that the diameter of the condylar circle was four inches. With the densmeter properly placed over the X-ray picture the disk 40 is rotated to bring a four-inch scale over the circle 35, as illustrated. Prior to this the center of the odontoid 55 has been marked as indicated at 56 and the center of the spinous process 57 has been marked as indicated at 58. It is now possible to obtain a direct reading of the displacement of the odontoid and spinous processes of the axis vertebra relative to the atlas vertebra.

Referring now to Figure 2, which illustrates a portion of the instrument on an enlarged scale, it will be observed that the center 56 of the odontoid is 2° left of zero on the scale and the center 58 of the spinous process is 3° right of center on the scale. However, it will be recalled that previous to use of the densmeter, it was determined that the atlas vertebra 12 was 1½° left. In order to obtain a correct figure for the displacement of the odontoid and spinous processes relative to an imaginary vertical center line it is necessary to apply a correction for the previously discovered lateral displacement of the atlas vertebra. Applying this correction at observed displacement of the center of the spinous process 3° to the right relative to the atlas vertebra means that in fact the spinous process is 1½° to the right. In like manner, the observed 2° left displacement of the center of the odontoid 55, when corrected by application of already known displacement of the atlas vertebra, results in a finding that the center of the odontoid is actually 3½° left.

It will be understood that the reading of the displacement of the various elements referred to in degrees refers to a displacement in degrees of arc of a circle substantially equal in diameter to the diameter of the condylar circle. The scales indicated as 3, 4, 5, 6 and 8 inch scales are formed so that each division thereon equals the length of arc subtended by an angle of 1° at a radius of 1½, 2, 2½, 3 or 4 inches, respectively.

By employing the densmeter as just described it is possible to arrive at a reading of the lateral displacement of the atlas vertebra and the odontoid and spinous processes of the axis vertebra relative to an imaginary vertical center line through the skull and upper vertebrae. Information thus obtained is valuable in carrying out treatment intended to correct the misalignment of the parts and is particularly valuable when a series of X-rays are taken before, during and after treatment so as to follow the improvement which results.

While there is illustrated and described a particular embodiment of densmeter, it will be appreciated that this illustration and description has been given merely to enable those skilled in the art to practice the invention, the scope of which is indicated by the appended claims.

What I claim as my invention is:

1. An instrument comprising a transparent plate having a median line thereon, a plurality of sets of comparison lines on said plate symmetrically placed with respect to said median line, transparent means movably carried by said plate having a plurality of scales each graduated from zero in both directions in a straight line in degrees of circular arc, said scales representing degrees of arcs of circles of different diameters, said means being movable to bring a selected one of said scales in a position perpendicular to said median line with the zero point of said scale in registry therewith.

2. An instrument comprising a transparent plate having a median line thereon, a plurality of sets of comparison lines on said plate symmetrically placed with respect to said median line, a transparent disk rotatably carried by said plate having a plurality of scales each graduated from zero in both directions in a straight line in degrees of circular arc, said scales representing degrees of arcs of circles of different diameters, said disk being movable to bring a selected one of said scales in a position perpendicular to said median line with the zero point of said scale in registry therewith.

3. An instrument comprising a transparent plate having a median line thereon, a plurality of sets of comparison lines on said plate symmetrically placed with respect to said median line, a transparent disk rotatably carried by said plate having a plurality of scales disposed generally radially of the center of rotation of said disk and each graduated from zero in both directions in a straight line in degrees of circular arc, said scales representing degrees of arcs of circles of different diameters, said disk being movable to bring a selected one of said scales in a position perpendicular to said median line with the zero point of said scale in registry therewith.

4. An instrument for determining lateral displacement of the odontoid and spinous processes in terms of degrees of arc of the condylar circle, a transparent plate for placement over an X-ray photograph of the skull and upper vertebrae, having a first line thereon for placement parallel to the atlas plane line of the photograph, a reference line perpendicular to the first line positionable to correspond to the median plane of the photograph, a plurality of guide lines symmetrically placed at opposite sides of said reference line to assist in locating the reference line on the photograph, a transparent member movably mounted on said plate having thereon a plurality of straight line scales arranged for selective positioning over and perpendicular to said reference line in position adjacent the atlas vertebra, odontoid and spinous processes, said scales being graduated in degrees of arcs of condylar circles of different diameters for direct reading of displacement of the odontoid and spinous processes in degrees of arc of the condylar circle relative to the atlas vertebra.

5. An instrument for determining lateral displacement of the odontoid and spinous processes in terms of degrees of arc of the condylar circle, a transparent plate for placement over an X-ray photograph of the skull and upper vertebrae, having a first line thereon for placement parallel to the atlas plane line of the photograph, a reference line perpendicular to the first line positionable to correspond to the median plane of the photograph, a plurality of guide lines symmetrically placed at opposite sides of said reference line to assist in locating the reference line on the photograph, a transparent member rotatably mounted on said plate having thereon a plurality of straight line scales arranged for selective positioning over and perpendicular to said reference line in position adjacent the atlas vertebra, odontoid and spinous processes, said scales being graduated in degrees of arcs of condylar circles of different diameters for direct reading of placement of the odontoid and spinous processes in degrees of arc of the condylar circle relative to the atlas vertebra.

6. An instrument for determining lateral displacement of the odontoid and spinous processes in terms of degrees of arc of the condylar circle, a transparent plate for placement over an X-ray photograph of the skull and upper vertebrae, having a first line thereon for placement parallel to the atlas plane line of the photograph, a reference line perpendicular to the first line positionable to correspond to the median plane of the photograph, a plurality of guide lines symmetrically placed at opposite sides of said reference line to assist in locating the reference line on the photograph, a transparent member rotatably mounted on said plate having thereon a plurality of straight line scales arranged for selective positioning over and perpendicular to said reference line in position adjacent the atlas vertebra, odontoid and spinous processes, said scales being graduated in degrees of arcs of condylar circles of different diameters for direct reading of displacement of the odontoid and spinous processes in degrees of arc of the condylar circle relative to the atlas vertebra, each of said scales having a zero point movable into registration with said reference line, and being graduated in opposite directions from said zero point to give a direct reading of displacement to either right or left.

JOHN F. GROSTIC.

REFERENCES CITED

The following references are of record in the file of this patent:

UNITED STATES PATENTS

| Number | Name | Date |
| --- | --- | --- |
| 1,122,429 | Schwager | Dec. 29, 1914 |
| 1,232,290 | Grunberg | July 3, 1917 |
| 1,245,304 | Zona | Nov. 6, 1917 |
| 1,390,027 | Fabyan | Sept. 6, 1921 |
| 1,528,944 | Newell | Mar. 10, 1925 |
| 1,790,572 | Bugbee | Jan. 27, 1931 |
| 1,907,873 | Richards et al. | May 9, 1933 |
| 2,118,773 | Ball | May 24, 1938 |
| 2,193,280 | Gunning | Mar. 12, 1940 |
| 2,485,674 | Suiter | Oct. 25, 1949 |